E. I. DODDS.
STAY BOLT.
APPLICATION FILED SEPT. 21, 1912.
1,079,223.
Patented Nov. 18, 1913.
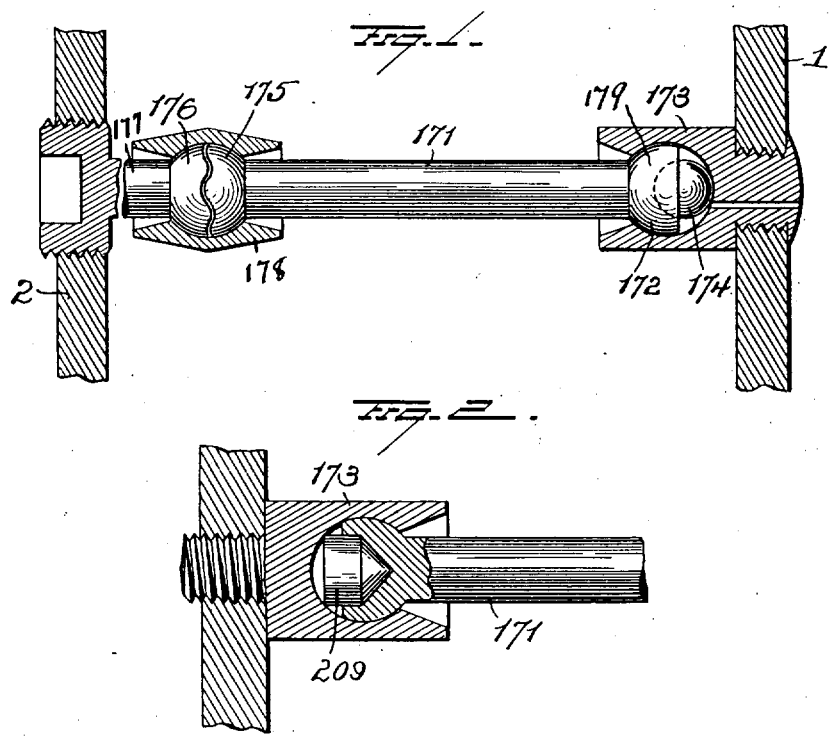

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,079,223.   Specification of Letters Patent.   Patented Nov. 18, 1913.

Original application filed September 25, 1911, Serial No. 651,051. Divided and this application filed September 21, 1912. Serial No. 721,678.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible couplings, and while designed primarily for connecting the inside and outside plates of locomotive and other boilers, may be used for other purposes, and is a division of application Serial Number 651,051, filed Sept. 25th, 1911.

The object of the invention is to provide improved means for permanently and flexibly connecting the two members of the coupling, and it consists in the details of construction and combinations of parts as will be more fully described and pointed out in the claims.

In the accompanying drawings, Figure 1 is a view in section partly in elevation of a flexible stay bolt embodying my invention and Fig. 2 is a similar view of a modified form.

1 represents the inside plate of a locomotive boiler and 2 the outside plate.

The bolt shank 171 is made solid and is entered at one end into a ball shaped socket 172 formed in the connector 173 attached to the inside plate 1, and is expanded and permanently secured therein, by heating it and driving it endwise against the hardened ball 174 located within the socket 172. By driving it endwise while in a heated condition, the end is expanded into a semi-spherical head 179 conforming to the concave wall in socket 172, and having a rocking fit with the latter. By expanding the end to form a head, the ball 174, becomes partly embedded in said head and necessarily moves with the latter. The opening or throat leading to the socket in the connector, is made flaring as shown so as to permit of the necessary angular movements of the bolt shank 171. The connector 173 is shown with a threaded shank screwed into sheet 1 and upset at its free end but it may be secured to the sheet or other part in any approved manner. The opposite end of the bolt shank 171 has a hemi-spherical enlargement 175 provided with a series of radial teeth, coöperating with similar teeth on the hemi-spherical head 176 of the connector 177 secured to the outer wall or sheet 2. The two heads 175 and 176 are themselves connected with capacity for relative angular adjustment by the coupling sleeve 178, into which they are entered, the ends of the sleeve being swaged down over the two heads to secure them permanently but flexibly together.

In the construction shown in Fig. 2, I employ a pointed stud 209, in lieu of the ball, and against which the headed end of the bolt shank 171 is driven to swage the same within its seat in the connector 173.

I make no claim in this application to the manner of coupling the two sections of the bolt as shown in Fig. 1, as this coupling is shown and claimed in application No. 721,675 filed by me September 21st, 1912.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. The combination of a member having a ball shaped socket therein, a member loose within said socket and a third member having an enlarged end to fit said socket, the loose member closely fitting a recess in said enlarged end and bearing against said socket.

2. The combination of a member having a ball shaped socket and a throat leading to said socket, a member loose within the socket and of less diameter than the throat, and a third member having an enlarged end partly fitting said socket and having a recess in which the loose member rests, the said loose member being held against the wall of the socket by the enlarged end of the third member.

In testimony whereof, I have signed this specification in the presence of two subscribing witnesses.

ETHAN I. DODDS.

Witnesses:
A. W. BRIGHT,
GEO. F. DOWNING.

Copies of this patent may be obtained for five cents each, by addressing the "Commissioner of Patents, Washington, D. C."